US012633055B2

(12) United States Patent
Zhang et al.

(10) Patent No.: US 12,633,055 B2
(45) Date of Patent: May 19, 2026

(54) METHOD AND APPARATUS FOR TRAINING PARAMETER ESTIMATION MODELS, DEVICE, AND STORAGE MEDIUM

(71) Applicant: BIGO TECHNOLOGY PTE. LTD., Singapore (SG)

(72) Inventors: Xiaowei Zhang, Guangzhou (CN); Zhongyuan Hu, Guangzhou (CN); Gengdai Liu, Guangzhou (CN)

(73) Assignee: BIGO TECHNOLOGY PTE. LTD., Singapore (SG)

( * ) Notice: Subject to any disclaimer, the term of this patent is extended or adjusted under 35 U.S.C. 154(b) by 410 days.

(21) Appl. No.: 18/248,315

(22) PCT Filed: Oct. 22, 2021

(86) PCT No.: PCT/CN2021/125575
§ 371 (c)(1),
(2) Date: Mar. 6, 2024

(87) PCT Pub. No.: WO2022/095721
PCT Pub. Date: May 12, 2022

(65) Prior Publication Data
US 2024/0296624 A1 Sep. 5, 2024

(30) Foreign Application Priority Data
Nov. 3, 2020 (CN) .......................... 202011211255.4

(51) Int. Cl.
*G06T 17/20* (2006.01)
*G06T 15/50* (2011.01)
(Continued)

(52) U.S. Cl.
CPC .............. *G06T 17/20* (2013.01); *G06T 15/50* (2013.01); *G06T 19/20* (2013.01); *G06V 10/60* (2022.01);
(Continued)

(58) Field of Classification Search
CPC ......... G06T 15/50; G06T 17/00; G06T 17/20; G06T 19/20; G06T 2207/10024;
(Continued)

(56) References Cited

U.S. PATENT DOCUMENTS 11,443,484 B2 * 9/2022 Vesdapunt .............. G06T 17/00
2016/0314619 A1 10/2016 Luo et al.
(Continued)

FOREIGN PATENT DOCUMENTS

CN 109191507 A 1/2019
CN 109934300 A 6/2019
(Continued)

OTHER PUBLICATIONS

Extended European Search Report Communication Pursuant to Rule 62 EPC for European Application No. 21888418.7 dated Sep. 13, 2024, which is a foreign counterpart application to this application.
(Continued)

*Primary Examiner* — Sing-Wai Wu
(74) *Attorney, Agent, or Firm* — Kolitch Romano Dascenzo Gates LLP

(57) ABSTRACT

Provided is a method for training parameter estimation models. The method includes: estimating reconstruction parameters specified for three-dimensional face reconstruction by inputting training samples in a face image training set to a pre-constructed neural network model, and reconstructing three-dimensional faces corresponding to the training samples by inputting the reconstruction parameters to a pre-constructed three-dimensional morphable model; calculating a plurality of loss functions of a plurality of pieces of two-dimensional supervision information between the three-dimensional faces and the training samples, and adjusting weights corresponding to the plurality of loss functions; and
(Continued)

Estimating reconstruction parameters specified for three-dimensional face reconstruction by inputting training samples in a face image training set to a pre-constructed neural network model, and reconstructing three-dimensional faces corresponding to the training samples by inputting the reconstruction parameters to a pre-constructed three-dimensional morphable model ⟶ S110

Calculating a plurality of loss functions of a plurality of pieces of two-dimensional supervision information between the three-dimensional faces and the training samples, and adjusting weights corresponding to the plurality of loss functions ⟶ S120

Generating fitting loss functions based on the plurality of loss functions and the weights corresponding to the plurality of loss functions, and acquiring a trained parameter estimation model by performing an inverse correction on the neural network model using the fitting loss functions ⟶ S130 generating fitting loss functions based on the plurality of loss functions and the weights corresponding to the plurality of loss functions, and acquiring a trained parameter estimation model by performing an inverse correction on the neural network model using the fitting loss functions.

19 Claims, 7 Drawing Sheets

(51) Int. Cl.

| | | |
|---|---|---|
| *G06T 19/20* | (2011.01) | |
| *G06V 10/60* | (2022.01) | |
| *G06V 10/774* | (2022.01) | |
| *G06V 10/776* | (2022.01) | |
| *G06V 10/82* | (2022.01) | |
| *G06V 40/16* | (2022.01) | |

(52) U.S. Cl.
    CPC .......... *G06V 10/774* (2022.01); *G06V 10/776* (2022.01); *G06V 10/82* (2022.01); *G06V 40/171* (2022.01)

(58) Field of Classification Search
    CPC . G06T 2207/20076; G06T 2207/20081; G06T 2207/20084; G06T 2207/30201; G06T 7/50; G06V 40/165; G06V 40/171; G06V 20/653; G06V 10/82; G06V 10/776; G06V 10/774; G06V 10/77; G06V 10/60; G06F 18/2135; G06N 3/02; G06N 3/04; G06N 3/045; G06N 3/08
    See application file for complete search history.

(56) References Cited

U.S. PATENT DOCUMENTS

| | | |
|---|---|---|
| 2021/0256752 A1 | 8/2021 | Chen |
| 2021/0286977 A1 | 9/2021 | Chen et al. |

FOREIGN PATENT DOCUMENTS

| | | |
|---|---|---|
| CN | 109978989 A | 7/2019 |
| CN | 110414370 A | 11/2019 |
| CN | 110619676 A | 12/2019 |
| CN | 111428667 A | 7/2020 |
| CN | 112529999 A | 3/2021 |

OTHER PUBLICATIONS

Lin, Jiangke, et al.; "Towards High-Fidelity 3D Face Reconstruction From In-the-wild Images Using Graph Convolutional Networks", 2020 IEEE/CVF Conference on Computer Vision and Pattern Recognition (CVPR), IEEE, Jun. 13, 2020, pp. 5890-5899, DOI: 10.1109/CVPR42600.2020.00593[retrieved on Aug. 3, 2020], section 3.4 Losses; p. 5891; figures 2-4.

International Search Report of the International Searching Authority for State Intellectual Property Office of the People's Republic of China in PCT application No. PCT/CN2021/125575 issued on Jan. 19, 2022, which is an international application to which this application claims priority.

Blanz, Volker, et al.; "A Morphable Model for the Synthesis of 3D Faces", In ACM Transactions on Graphic (Proceedings of SIGGRAPH):187-194, 1999.

Chen, Ke; "3D Face Reconstruction from Single Facial Image Based on Convolutional Neural Network", Chinese Selected Doctoral Dissertations and Master's Theses Full-Text Databases(Master) Information Science and Technology Series, No. 07, Jul. 15, 2019, ISSN: 1674-0246, chapter 3, English translation of the abstract and chapter 3.

Luo, Yao; "Research on the Method of 3D Face Reconstruction from a Single Image", Chinese Selected Doctoral Dissertations and Master's Theses Full-Text Databases(Master) Information Science and Technology Series, No. 07, Jul. 15, 2020, ISSN: 1674-0246, chapter 4, English translation of the abstract and chapter 4.

Zhou, Jian, et al.; "3D Face Reconstruction and Dense Face Alignment Method Based on Improved 3D Morphable Model", Journal of Computer Applications, Jun. 2, 2020, ISSN: 1001-9081, pp. 3-6.

Notice of Reasons for Refusal of Japanese application No. 2023-523272 issued on Jan. 29, 2024.

China National Intellectual Property Administration, First Office Action in Chinese Patent Application No. 202011211255.4 issued on Jun. 13, 2024, which is a foreign counterpart application corresponding to this U.S. Patent Application, to which this application claims priority.

Tran, Luan et al., "Towards High-fidelity Nonlinear 3D Face Morphable Model", CVPR 2019, Apr. 30, 2019, entire document.

* cited by examiner

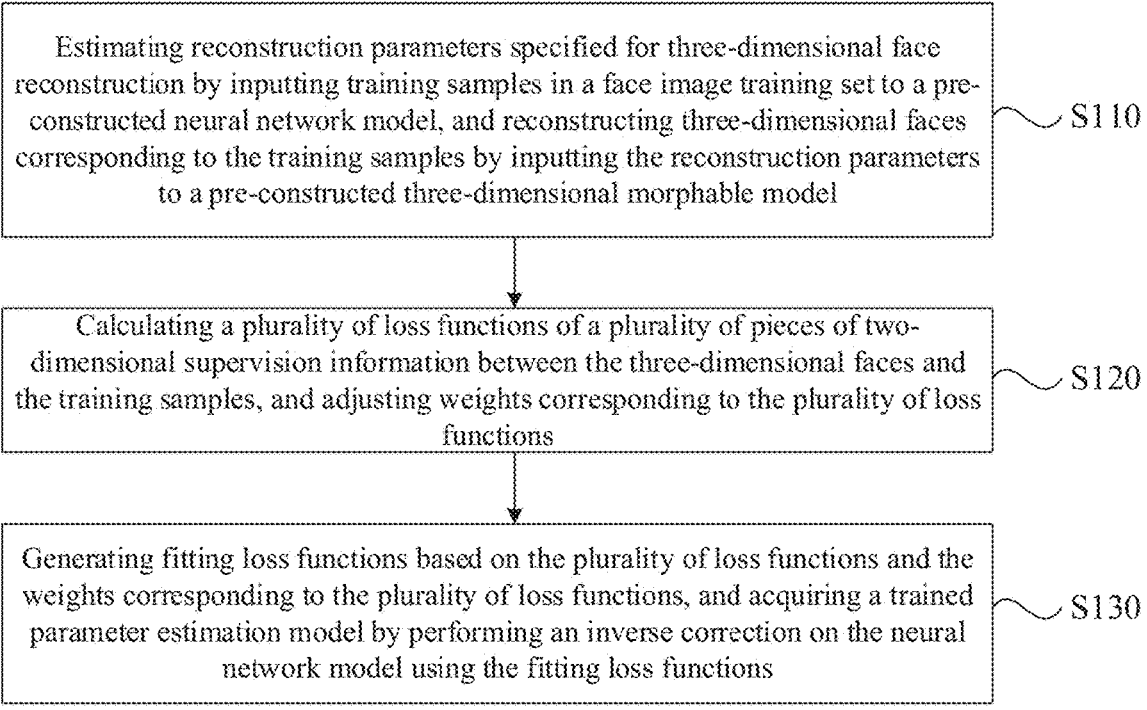

Estimating reconstruction parameters specified for three-dimensional face reconstruction by inputting training samples in a face image training set to a pre-constructed neural network model, and reconstructing three-dimensional faces corresponding to the training samples by inputting the reconstruction parameters to a pre-constructed three-dimensional morphable model    S110

Calculating a plurality of loss functions of a plurality of pieces of two-dimensional supervision information between the three-dimensional faces and the training samples, and adjusting weights corresponding to the plurality of loss functions    S120

Generating fitting loss functions based on the plurality of loss functions and the weights corresponding to the plurality of loss functions, and acquiring a trained parameter estimation model by performing an inverse correction on the neural network model using the fitting loss functions    S130

FIG. 1A

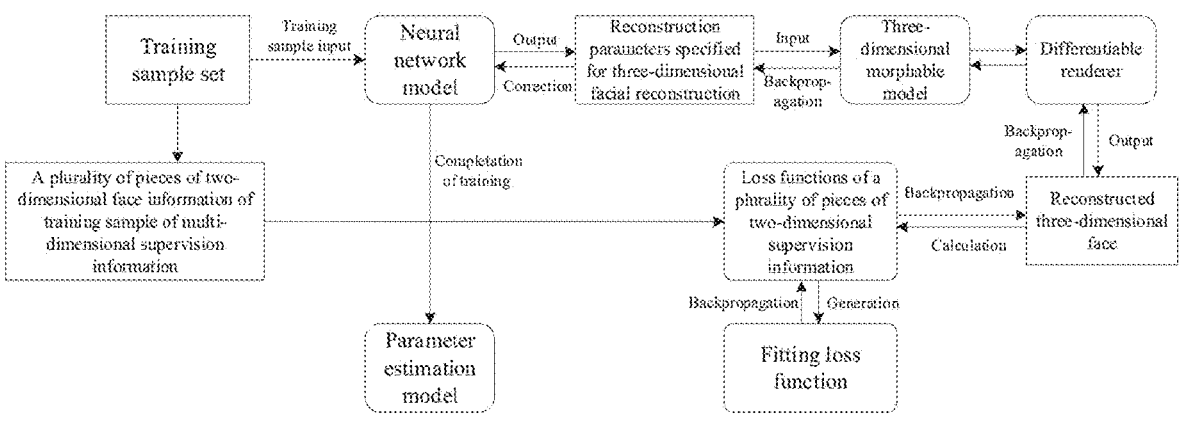

FIG. 1B

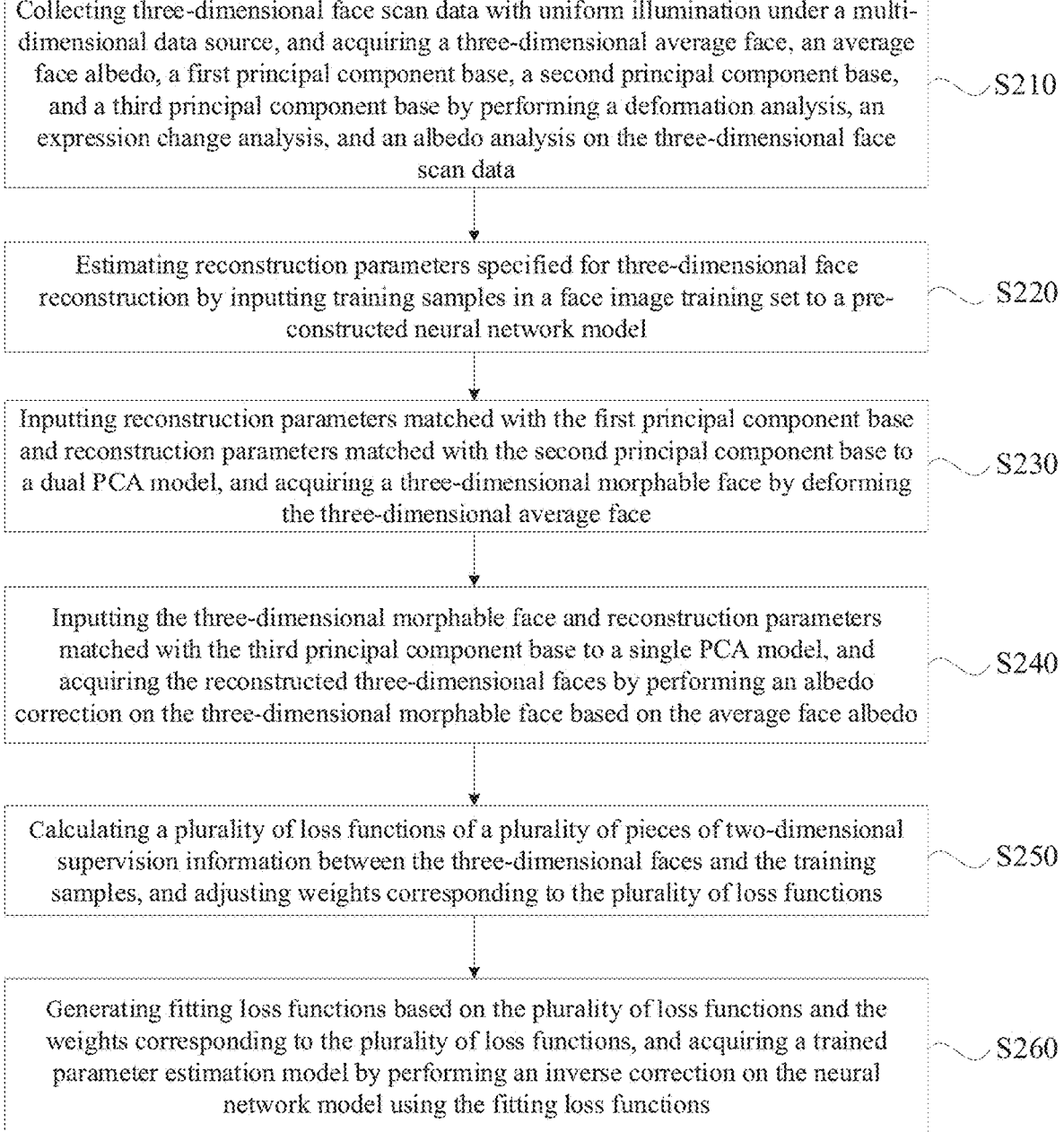

Collecting three-dimensional face scan data with uniform illumination under a multi-dimensional data source, and acquiring a three-dimensional average face, an average face albedo, a first principal component base, a second principal component base, and a third principal component base by performing a deformation analysis, an expression change analysis, and an albedo analysis on the three-dimensional face scan data ~S210

Estimating reconstruction parameters specified for three-dimensional face reconstruction by inputting training samples in a face image training set to a pre-constructed neural network model ~S220

Inputting reconstruction parameters matched with the first principal component base and reconstruction parameters matched with the second principal component base to a dual PCA model, and acquiring a three-dimensional morphable face by deforming the three-dimensional average face ~S230

Inputting the three-dimensional morphable face and reconstruction parameters matched with the third principal component base to a single PCA model, and acquiring the reconstructed three-dimensional faces by performing an albedo correction on the three-dimensional morphable face based on the average face albedo ~S240

Calculating a plurality of loss functions of a plurality of pieces of two-dimensional supervision information between the three-dimensional faces and the training samples, and adjusting weights corresponding to the plurality of loss functions ~S250

Generating fitting loss functions based on the plurality of loss functions and the weights corresponding to the plurality of loss functions, and acquiring a trained parameter estimation model by performing an inverse correction on the neural network model using the fitting loss functions ~S260

FIG. 2A

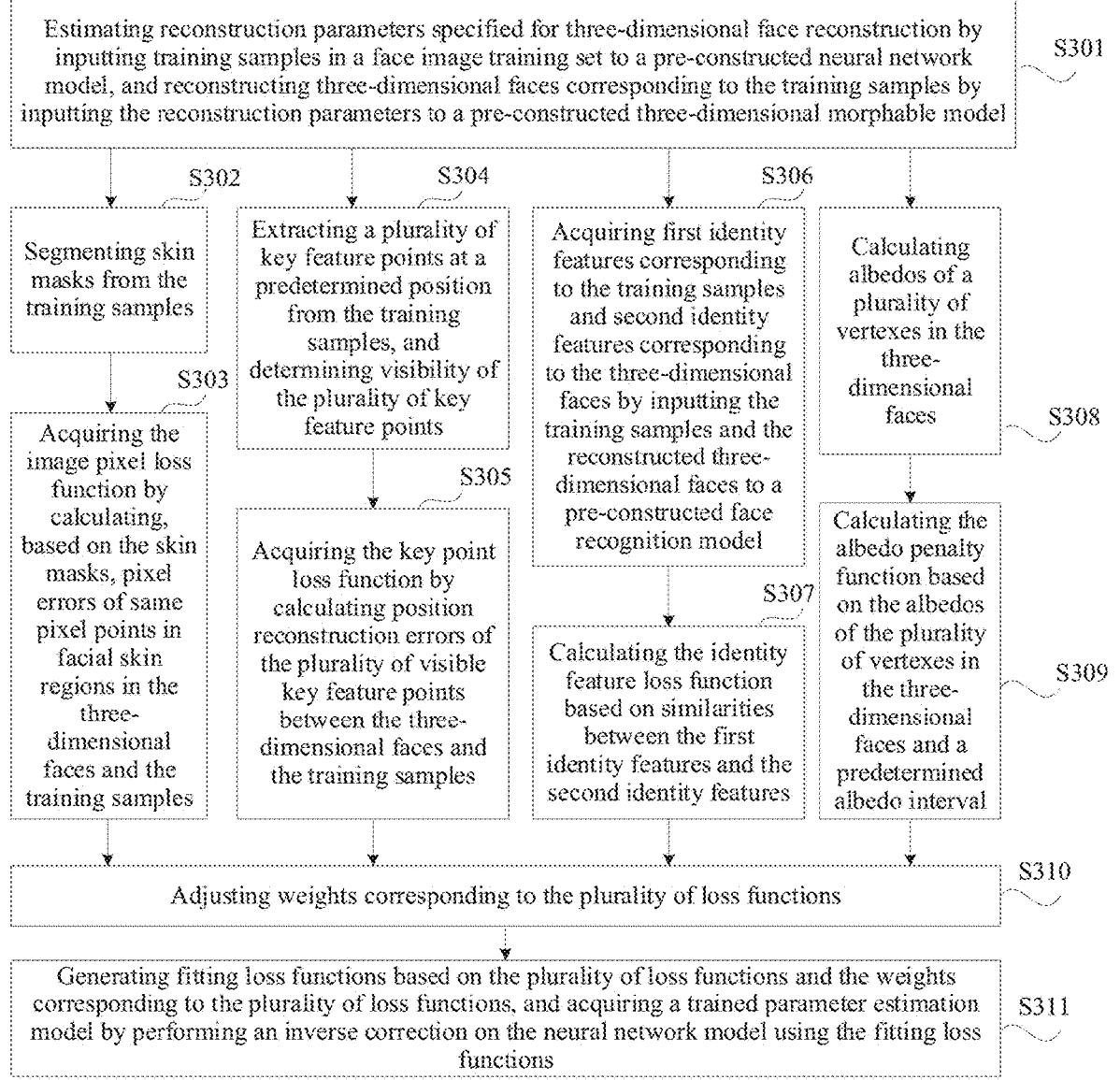

Estimating reconstruction parameters specified for three-dimensional face reconstruction by inputting training samples in a face image training set to a pre-constructed neural network model, and reconstructing three-dimensional faces corresponding to the training samples by inputting the reconstruction parameters to a pre-constructed three-dimensional morphable model — S301

S302

S304

S306

Segmenting skin masks from the training samples

Extracting a plurality of key feature points at a predetermined position from the training samples, and determining visibility of the plurality of key feature points Acquiring first identity features corresponding to the training samples and second identity features corresponding to the three-dimensional faces by inputting the training samples and the reconstructed three-dimensional faces to a pre-constructed face recognition model Calculating albedos of a plurality of vertexes in the three-dimensional faces — S308

S303

Acquiring the image pixel loss function by calculating, based on the skin masks, pixel errors of same pixel points in facial skin regions in the three-dimensional faces and the training samples

S305

Acquiring the key point loss function by calculating position reconstruction errors of the plurality of visible key feature points between the three-dimensional faces and the training samples

S307

Calculating the identity feature loss function based on similarities between the first identity features and the second identity features Calculating the albedo penalty function based on the albedos of the plurality of vertexes in the three-dimensional faces and a predetermined albedo interval — S309

S310

Adjusting weights corresponding to the plurality of loss functions

Generating fitting loss functions based on the plurality of loss functions and the weights corresponding to the plurality of loss functions, and acquiring a trained parameter estimation model by performing an inverse correction on the neural network model using the fitting loss functions — S311

FIG. 3A

METHOD AND APPARATUS FOR TRAINING PARAMETER ESTIMATION MODELS, DEVICE, AND STORAGE MEDIUM

CROSS-REFERENCE TO RELATED APPLICATIONS

The present disclosure is a U.S. national stage of international application No. PCT/CN2021/125575, filed on Oct. 22, 2021, which claims priority to Chinese Patent Application No. 202011211255.4, filed on Nov. 3, 2020, the disclosures of which are herein incorporated by references in their entireties.

TECHNICAL FIELD

The present disclosure relates to the field of image processing technologies, and for example, to a method and apparatus for training parameter estimation models, a device, and a storage medium.

BACKGROUND OF THE INVENTION

With the development of video technologies, there is an increasing demand for creating realistic face models in entertainment applications with a demand of display of face images, such as face animation, face recognition, and augmented reality (AR). It is difficult to create a realistic three-dimensional face model, which requires to reconstruct a corresponding three-dimensional face for one or more two-dimensional face images or depth images to cause that the three-dimensional face includes a diversity of types of three-dimensional information, such as face shapes, colors, illumination, and head rotation angles.

SUMMARY OF THE INVENTION

The present disclosure provides a method and apparatus for training parameter estimation models, a device, and a storage medium.

The present disclosure provides a method for training parameter estimation models. The method includes:

estimating reconstruction parameters specified for three-dimensional face reconstruction by inputting training samples in a face image training set to a pre-constructed neural network model, and reconstructing three-dimensional faces corresponding to the training samples by inputting the reconstruction parameters to a pre-constructed three-dimensional morphable model;

calculating a plurality of loss functions of a plurality of pieces of two-dimensional supervision information between the three-dimensional faces and the training samples, and adjusting weights corresponding to the plurality of loss functions; and generating fitting loss functions based on the plurality of loss functions and the weights corresponding to the plurality of loss functions, and acquiring a trained parameter estimation model by performing an inverse correction on the neural network model using the fitting loss functions.

The present disclosure further provides a computer device for training parameter estimation models. The computer device for training parameter estimation models includes:

one or more processors; and a memory, configured to store one or more programs;

wherein the one or more processors, when running the one or more programs, are caused to perform the above method for training the parameter estimation models.

The present disclosure further provides a non-transitory computer-readable storage medium storing a computer program thereon. The computer program, when run by a processor, causes the processor to perform the above method for training the parameter estimation models.

BRIEF DESCRIPTION OF THE DRAWINGS

FIG. 1A is a flowchart of a method for training parameter estimation models according to a first embodiment of the present disclosure;

FIG. 1B is a schematic diagram of a principle of a process of training a parameter estimation model according to a first embodiment of the present disclosure;

FIG. 2A is a flowchart of a method for training parameter estimation models according to a second embodiment of the present disclosure;

FIG. 3A is a flowchart of a method for training parameter estimation models according to a third embodiment of the present disclosure;

DETAILED DESCRIPTION OF THE INVENTION

Figure 1C:
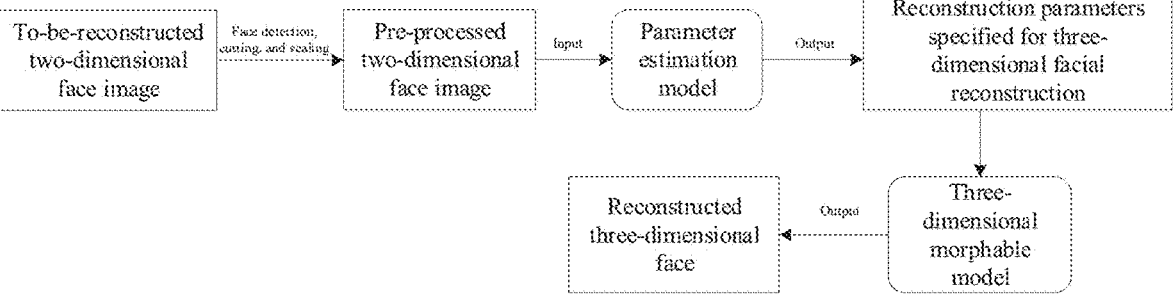
FIG. 1C is a schematic diagram of a principle of a process of reconstructing a three-dimensional face in the method according to the first embodiment of the present disclosure.

The present disclosure will be described hereinafter with reference to the accompanying drawings and embodiments. The specific embodiments described herein are merely illustrative of the present disclosure. For convenience of description, only the portions relevant to the present disclosure are shown in the drawings.

In a three-dimensional face reconstruction method, three-dimensional scan data of a large number of faces is usually collected firstly. Then a corresponding three-dimensional morphable model (3DMM) is constructed based on the three-dimensional scan data. In this case, the three-dimensional morphable model includes an average face shape of a standard face, a principal component base indicating a change of face identity, and a principal component base indicating a change of face expression. Then reconstruction parameters corresponding to two groups of the principal component bases are estimated based on a current to-be-reconstructed two-dimensional face image, such that the average face shape is morphed by correspondingly adjusting, based on the reconstruction parameters, the two groups of the principal component bases, and a corresponding three-dimensional face is reconstructed accordingly.

The reconstruction parameters corresponding to the principal component bases are generally estimated in two methods. In one method, pixel values of feature points in the two-dimensional face image are directly determined as supervision information of three-dimensional face deformation to estimate the reconstruction parameters corresponding to the principal component bases. However, as transformation from a two-dimensional picture to three-dimensional reconstruction is a morbid problem, using only the pixel values of feature points as the supervision information cannot ensure an accurate estimation of the reconstruction parameters. In the other method, the current to-be-reconstructed multi-view two-dimensional face images or depth information are used as input to estimate the reconstruction parameters corresponding to the principal component bases. However, in this method, a plurality of face images are required to be collected, and even a special sensor is required to collect a depth image, that is, a reconstruction scene can be limited. In addition, the collection requirements of the reconstruction parameters are excessive, and thus an operation of three-dimensional face reconstruction is complicated.

First Embodiment

FIG. 1A is a flowchart of a method for training parameter estimation models according to a first embodiment of the present disclosure, and the embodiment may be applicable to any situation of three-dimensional face reconstruction that requires estimation of corresponding reconstruction parameters. The method for training the parameter estimation models according to the embodiments is performed by an apparatus for training parameter estimation models according to some embodiments of the present disclosure. The apparatus is achieved by software and/or hardware, and is integrated in a computer device for performing the method.

Referring to FIG. 1A, the method includes the following processes.

In S110, reconstruction parameters specified for three-dimensional face reconstruction are estimated by inputting training samples in a face image training set to a pre-constructed neural network model, and three-dimensional faces corresponding to the training samples are reconstructed by inputting the reconstruction parameters to a pre-constructed three-dimensional morphable model.

Situations, such as face animation, face recognition, augmented reality, and face beauty all require the three-dimensional face reconstruction technologies. Three-dimensional face reconstruction refers to reconstruction of a plurality of pieces of three-dimensional information of a two-dimensional face image, such as a three-dimensional geometric shape, an albedo, illumination information, and a head rotation angle. The three-dimensional geometric shape is composed of a set of vertexes in three-dimensional space, and each vertex is uniquely determined by corresponding three-dimensional coordinates (x, y, z). For the three-dimensional face reconstruction, a corresponding three-dimensional morphable model is pre-constructed, the three-dimensional morphable model is used to perform modeling of a shape and appearance of the three-dimensional face on any two-dimensional face image, and any face shape is expressed by a sum of a standard face and a group of linear combinations of principal component vectors indicating changes of face shape and face expression. Therefore, an average face shape of the standard face is correspondingly deformed and face expression is adjusted based on different linear combination forms of the principal component vectors, such that the corresponding three-dimensional face is reconstructed.

In the embodiments, the reconstruction parameters specified for the three-dimensional face reconstruction refer to a plurality of types of parameters indicating the linear combination forms of referenced principal component vectors and parameters (such as an illumination parameter, a face position, and a gesture) affecting a realistic effect of the three-dimensional face in the case that the average face shape is deformed and the face expression is adjusted based on the three-dimensional morphable model. Corresponding deformation of the average face shape and change of face expression are controlled based on the reconstruction parameters, such that the corresponding three-dimensional face is generated, and the display of details, such as an illumination condition and a gesture angle in the three-dimensional face is improved. Therefore, an accuracy of estimating reconstruction parameters of a to-be-reconstructed two-dimensional face image directly affects a reality of the reconstructed three-dimensional face corresponding to the two-dimensional face image. Therefore, for a more realistic reconstructed three-dimensional face, it is necessary to accurately estimate a plurality of reconstruction parameters specified for the three-dimensional face reconstruction from the to-be-reconstructed two-dimensional face image. The reconstruction parameters in the embodiments include a deformation parameter indicating a change of face shape, an expression parameter indicating a change of face expression, an albedo parameter indicating a change of a face albedo, an illumination parameter indicating a change of face illumination, a position parameter indicating face translation, a rotation parameter indicating a head gesture, and the like. The albedo parameter includes red-green-blue (RGB) color information of the to-be-reconstructed two-dimensional face image.

In some embodiments, for accurate estimation of a plurality of types of reconstruction parameters specified for the three-dimensional face reconstruction for any to-be-reconstructed two-dimensional face image, in the embodiments, a neural network model is initially constructed, and then parameter estimation training is performed on the neural network model based on a large number of face image samples, such that a parameter estimation model capable of accurately estimating the reconstruction parameters specified for the three-dimensional face reconstruction is acquired. The neural network model is a convolutional neural network. In the case that the parameter estimation training is performed on the neural network model, a corresponding face image training set is constructed firstly. The face image training set includes a large number of face images, with different sources and different types, determined as training samples of the neural network model. As shown in FIG. 1B, the training samples in the face image training set are inputted to the pre-constructed neural network model, and then face features in the inputted training samples are compared and analyzed with face features of the standard face by the neural network model. A plurality of types of operation parameters used in converting the standard face to a face in the training sample are determined, and values of the reconstruction parameters used in performing the three-dimensional face reconstruction on the training samples are estimated. In this case, in the embodiments, the accuracy of the estimated reconstruction parameters is determined by analyzing the reality of the reconstructed three-dimensional faces upon performing the three-dimensional face reconstruction on the training sample by the three-dimensional morphable model using the reconstruction parameters.

Therefore, after the reconstruction parameters used in performing the three-dimensional face reconstruction on the training sample are estimated by the neural network model, the reconstruction parameters are correspondingly inputted to the pre-constructed three-dimensional morphable model, corresponding deformation, expression change, and albedo change are performed on a standard face in the three-dimensional morphable model by the three-dimensional morphable model using the reconstruction parameters, and corresponding three-dimensional detail display information is correspondingly adjusted, such that the three-dimensional face corresponding to the training sample is reconstructed. The reality of the reconstructed three-dimensional face is analyzed by comparing similarity between the training sample and the reconstructed three-dimensional face.

In S120, a plurality of loss functions of a plurality of pieces of two-dimensional supervision information between the three-dimensional faces and the training samples are calculated, and weights corresponding to the plurality of loss functions are adjusted.

In some embodiments, for analysis of the reality of the reconstructed three-dimensional face relative to the face in the training sample, a corresponding loss function is predetermined in the embodiments, and the similarity between the reconstructed three-dimensional face and the training sample is compared by the loss function. In the embodiments, a plurality of pieces of two-dimensional supervision information indicate that the similarity between the reconstructed three-dimensional face and the training sample under a plurality of supervision dimensions is judged comprehensively based on the plurality of pieces of two-dimensional supervision information, and the loss functions of the plurality of pieces of two-dimensional supervision information are set to avoid a reconstruction error of the three-dimensional face as comprehensively as possible. Illustratively, the loss functions of the plurality of pieces of two-dimensional supervision information in the embodiments include: an image pixel loss function, a key point loss function, an identity feature loss function, an albedo penalty function, and a regular term corresponding to a target reconstruction parameter in the reconstruction parameters specified for the three-dimensional face reconstruction.

Upon reconstruction of the three-dimensional faces corresponding to the training samples, reconstruction errors between the reconstructed three-dimensional faces and the training samples under dimensions of the plurality of pieces of supervision information, that is, values of the loss functions, are calculated by the currently set loss functions of the plurality of pieces of two-dimensional supervision information. The reality of the reconstructed three-dimensional face of each piece of supervision information is further analyzed based on the values of the plurality of loss functions, such that an estimation accuracy of the trained neural network model of each piece of supervision information is determined. Further, the weights corresponding to the plurality of loss functions are correspondingly adjusted to improve estimation capability in next training.

Illustratively, in the embodiments, by calculating the image pixel loss function, the key point loss function, the identity feature loss function, and the albedo penalty function between the three-dimensional face and the training sample, and the regular term corresponding to the target reconstruction parameter in the reconstruction parameters specified for the three-dimensional face reconstruction, a reconstruction accuracy capability of the current training process for an image pixel, a key point, an identity feature, an albedo, and a plurality of reconstruction parameters in the three-dimensional face reconstruction is determined. The weights of the plurality of loss functions are correspondingly adjusted based on the reconstruction capability, and the training is continued to continuously improve a capability of estimating the reconstruction parameters in the three-dimensional face reconstruction.

In addition, as the reconstructed three-dimensional face only includes a three-dimensional face image, and the training sample further displays a background image of a non-face image in addition to the face image, as shown in FIG. 1B, for the accuracy of calculating loss between the three-dimensional face and the training sample, prior to calculating the plurality of loss functions of the plurality of pieces of two-dimensional supervision information between the three-dimensional face and the training sample, the embodiments further include: rendering the three-dimensional face by a differentiable renderer, and training the parameter estimation model based on the rendered three-dimensional face.

The three-dimensional face is rendered by the differentiable renderer, such that the texture and the image of the rendered three-dimensional face are more similar to the training sample, and the parameter estimation model is more accurately trained subsequently based on the rendered three-dimensional face.

In S130, fitting loss functions are generated based on the plurality of loss functions and the weights corresponding to the plurality of loss functions, and a trained parameter estimation model is acquired by performing an inverse correction on the neural network model using the fitting loss function.

Upon calculation of the plurality of loss functions of the plurality of pieces of two-dimensional supervision information between the three-dimensional faces and the training samples, and adjustment of the weights corresponding to the plurality of loss functions, the plurality of loss functions of the plurality of pieces of two-dimensional supervision information are integrated based on the weights corresponding to the plurality of loss functions to generate corresponding fitting loss functions, and the fitting loss functions are determined as the loss functions of the whole training process of the neural network model. Then backpropagation is performed on the whole training process by the fitting loss function to correct the network parameters in the neural network model. Reconstruction parameters of the next training sample in the three-dimensional face reconstruction are estimated by the corrected neural network model according to the above processes, such that the training process is further performed, the inverse correction is continuously performed on the neural network model, and the finally trained neural network model is determined as a trained parameter estimation model. The inverse correction is continuously performed on the neural network model using the fitting loss functions in the embodiments based on the two-dimensional face information of the plurality of pieces of supervision information without referring to additional three-dimensional face information prior to reconstructing the three-dimensional face to acquire the trained parameter estimation model, such that the method for training the parameter estimation model used for estimating corresponding reconstruction parameters in the three-dimensional face reconstruction is optimized. The parameter estimation model is trained based on the loss functions of the plurality of pieces of two-dimensional supervision information, such that reference information in the training is more comprehensive, and thus the accuracy of estimating the reconstruction parameters used in the three-dimensional face reconstruction is improved.

For example, in the case that the loss functions of the plurality of pieces of two-dimensional supervision information are: an image pixel loss function $L_{photometric}$, a key point loss function $L_{landmark}$, an identity feature loss function $L_{perception}$, an albedo penalty function $L_{box}$, and a regular term corresponding to a target reconstruction parameter (an adjustment parameter $\alpha$ of a principal component vector indicating the change of face shape, an adjustment parameter $\delta$ of a principal component vector indicating the change of face expression, an adjustment parameter $\beta$ of a principal component vector indicating the change of face albedo, and an illumination parameter $\gamma$) in the reconstruction parameters specified for the three-dimensional face reconstruction, the fitting loss function in the embodiment is:

$$L = \lambda_P L_{photometric} + \lambda_l L_{landmark} + \lambda_{id} L_{perception} +$$
$$\lambda_b L_{box} + \lambda_\alpha \|\alpha\|_2 + \lambda_\beta \|\beta\|_2 + \lambda_\delta \|\delta\|_2 + \lambda_\gamma \|\gamma\|_2 \cdot \lambda_P$$

represents a weight corresponding to the image pixel loss function, $\lambda_l$ represents a weight corresponding to the key point loss function, $\lambda_{id}$ represents a weight corresponding to the identity feature loss function, and $\lambda_b$ represents a weight corresponding to the albedo penalty function, and $\lambda_\alpha$, $\lambda_\beta$, $\lambda_\delta$, and $\lambda_\gamma$ represent weights corresponding to regular terms corresponding to target reconstruction parameters in the plurality of reconstruction parameters specified for the three-dimensional face reconstruction, respectively.

Upon acquisition of the trained parameter estimation model, the reconstruction parameters of any to-be-reconstructed two-dimensional face image in the three-dimensional face reconstruction can be accurately estimated by the parameter estimation model. Therefore, upon the acquisition of the trained parameter estimation model by performing the inverse correction on the neural network model using the fitting loss function, the embodiments further include: inputting to-be-reconstructed two-dimensional face images to the parameter estimation model, estimating reconstruction parameters specified for three-dimensional face reconstruction, and reconstructing three-dimensional faces corresponding to the two-dimensional face images by inputting the reconstruction parameters to a pre-constructed three-dimensional morphable model.

As shooting sizes of to-be-reconstructed two-dimensional face images are different, for the accuracy of the three-dimensional face reconstruction, as shown in FIG. 1C, in the embodiments, face detection is first performed on the to-be-reconstructed two-dimensional face image to cut out a two-dimensional face image including a face region. A corresponding scaling operation is performed on the cut two-dimensional face image to acquire a corresponding size (for example, 224*224 pixels), such that image requirements of the parameter estimation model on estimation of the reconstruction parameters in the three-dimensional face reconstruction are met. Then the pre-processed two-dimensional face image is further inputted to the parameter estimation model, and a plurality of types of reconstruction parameters required in the three-dimensional face reconstruction of the two-dimensional face image are accurately estimated by the parameter estimation model. Further, the reconstruction parameters are inputted to the pre-constructed three-dimensional morphable model, and corresponding deformation, expression change, and the like are performed on a standard face defined in the three-dimensional morphable model by the three-dimensional morphable model using the reconstruction parameters, and corresponding three-dimensional detail display information is adjusted, such that the three-dimensional face corresponding to the two-dimensional face image is reconstructed. Therefore, a deformation process of a to-be-reconstructed face image in the three-dimensional morphable model is more accurate, such that the accuracy of the three-dimensional face reconstruction is ensured, and operation complexity of the three-dimensional face reconstruction is reduced without deploying additional information devices in the three-dimensional face reconstruction.

According to the technical solutions provided in the embodiments, a corresponding neural network model is pre-constructed for a plurality of reconstruction parameters specifically used in the three-dimensional face reconstruction. Each training sample in a face image training set is inputted to the neural network model to estimate the reconstruction parameters required in the three-dimensional face reconstruction of the training sample, and the reconstruction parameters are inputted to the pre-constructed three-dimensional morphable model to reconstruct the three-dimensional face corresponding to the training sample. The fitting loss function in training the neural network model is generated by calculating the plurality of loss functions of the plurality of pieces of two-dimensional supervision information between the three-dimensional face and the training sample and adjusting the weights corresponding to the plurality of loss functions. The inverse correction is continuously performed on the neural network model using the fitting loss functions based on the two-dimensional face information of the plurality of pieces of supervision information without referring to additional three-dimensional face information prior to reconstructing the three-dimensional face to acquire the trained parameter estimation model, such that the method for training the parameter estimation models used for estimating the corresponding reconstruction parameters in the three-dimensional face reconstruction is optimized. The parameter estimation model is trained based on the loss functions of the plurality of pieces of two-dimensional supervision information, such that the reference information in the training is more comprehensive, and thus the accuracy of estimating the reconstruction parameters used in the three-dimensional face reconstruction is improved. Meanwhile, the reconstruction parameters in the three-dimensional face reconstruction are estimated by the trained parameter estimation model, such that the deformation process of the to-be-reconstructed face image in the three-dimensional morphable model is more accurate, the accuracy of the three-dimensional face reconstruction is ensured, operation complexity of the three-dimensional face reconstruction is reduced without deploying additional information devices in the three-dimensional face reconstruction.

Second Embodiment

Figure 2B:
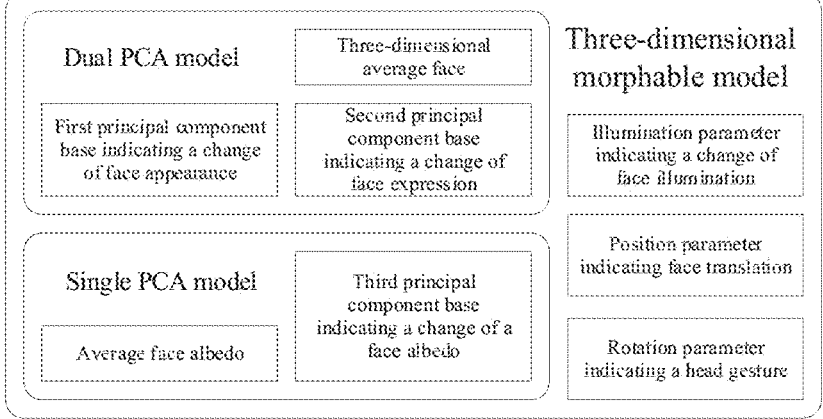
FIG. 2B is a schematic structural diagram of a three-dimensional morphable model for three-dimensional face reconstruction according to a second embodiment of the present disclosure.

FIG. 2A is a flowchart of a method for training parameter estimation models according to a second embodiment of the present disclosure, and FIG. 2B is a schematic structural diagram of a three-dimensional morphable model for three-dimensional face reconstruction according to a second embodiment of the present disclosure. The embodiments are illustrated based on the above embodiments.

The three-dimensional morphable model in the embodiments includes a dual principal component analysis (PCA) model and a single PCA model. As shown in FIG. 2B, the dual PCA model is mainly configured to model the changes of face appearance and expression in the three-dimensional face reconstruction, and the single PCA model is mainly configured to model the change of a face albedo in the three-dimensional face reconstruction.

The dual PCA model in the embodiments includes a three-dimensional average face, a first principal component base indicating the change of face appearance, and a second principal component base indicating the change of face expression, which is represented as: $S=\overline{S}+I_{base}\alpha+E_{base}\delta$. $\overline{S}$ represents the three-dimensional average face defined in the dual PCA model, $I_{base}$ represents the first principal component base indicating the change of face appearance, $E_{base}$ represents the second principal component base indicating the change of face expression, $\alpha$ represents a face identity parameter defined to indicate the change of the first principal component base and required to be estimated in performing the three-dimensional face reconstruction on the to-be-reconstructed face image, and $\delta$ represents a face expression parameter defined to indicate the change of the second principal component base and required to be estimated in performing the three-dimensional face reconstruction on the to-be-reconstructed face image.

The single PCA model in the embodiments includes an average face albedo and a third principal component base indicating the change of a face albedo, which is represented as $T=\overline{T}+T_{base}\beta$. $\overline{T}$ represents the average face albedo defined in the single PCA model, $T_{base}$ represents the third principal component base indicating the change of the face albedo in the single PCA model, and $\beta$ represents an albedo parameter defined to indicate the change of the third principal component base and required to be estimated in performing the three-dimensional face reconstruction on the to-be-reconstructed face image. The albedo parameter includes RGB color information of a plurality of vertexes in the face image to achieve color reconstruction in the three-dimensional face reconstruction.

In addition, for three-dimensional detail features in the three-dimensional face reconstruction, the three-dimensional morphable model of the embodiments further includes an illumination parameter $\gamma$ indicating the change of face illumination, a position parameter t indicating face translation, and a rotation parameter p indicating a head gesture. In the embodiments, spherical harmonic illumination is determined as illumination in a three-dimensional scene to estimate the corresponding illumination parameter $\gamma$.

Therefore, for accurate reconstruction of the three-dimensional face, the reconstruction parameters specified for the three-dimensional face reconstruction in the embodiment are $(\alpha, \delta, \beta, \gamma, t, p)$.

In some embodiments, for the accuracy of the three-dimensional face reconstruction, in the dual PCA model in the embodiments, a number of first principal component bases indicating the change of face appearance is 80, a number of second principal component bases indicating the change of face expression is 30. In the single PCA model, a number of third principal component bases indicating the change of the face albedo is 79, and a number of illumination parameters is 27, which includes nine color parameters of each of R. G. B color channels, and numbers of position parameters and rotation parameters are three. The numbers of principal component bases and illumination parameters according to the embodiments are merely exemplary, which are set according to the corresponding reconstruction requirements and are not limited in the embodiments.

As shown in FIG. 2A, the embodiments mainly explain and illustrate in detail a reconstruction process of the three-dimensional face reconstruction by a three-dimensional morphable model including the dual PCA model and the single PCA model.

In some embodiments, as shown in FIG. 2A, the embodiments include the following steps.

In S210, three-dimensional face scan data with uniform illumination under a multi-dimensional data source is collected, and the three-dimensional average face, the average face albedo, the first principal component base, the second principal component base, and the third principal component base are acquired by performing a deformation analysis, an expression change analysis, and an albedo analysis are performed on the three-dimensional face scan data.

In some embodiments, for accurate judgement of a principal component base capable of affecting the reality of the three-dimensional face reconstruction, a three-dimensional (3D) scanning technology is firstly used to scan a large amount of face information with uniform illumination under the multi-dimensional data source of different ethnicities, ages, sexes, skin colors, expressions, and the like, such that the three-dimensional face scan data with the uniform illumination under the multi-dimensional data source is acquired. Subsequently, the corresponding deformation analysis, expression change analysis, and albedo analysis are performed on the large amount of three-dimensional face scan data to acquire the corresponding three-dimensional average face, average face albedo, the first principal component base indicating the change of face appearance, the second principal component base indicating the change of face expression, and the third principal component base indicating the change of the face albedo, such that the corresponding three-dimensional morphable model is constructed subsequently to perform the accurate three-dimensional reconstruction on the face image.

In S220, the reconstruction parameters specified for the three-dimensional face reconstruction are estimated by inputting training samples in a face image training set to a pre-constructed neural network model.

In S230, the reconstruction parameters matched with the first principal component base and reconstruction parameters matched with the second principal component base are inputted to a dual PCA model, and a three-dimensional morphable face is acquired by deforming the three-dimensional average face.

In some embodiments, upon estimation of a plurality of types of reconstruction parameters in performing the three-dimensional face reconstruction on the training samples, the plurality of types of reconstruction parameters are inputted to the three-dimensional morphable model to deform the three-dimensional average face. In this case, the three-dimensional morphable model includes the dual PCA model and the single PCA model. Different PCA models have different reconstruction functions. The dual PCA model is mainly configured to model the changes of face appearance and expression in the three-dimensional face reconstruction, and the single PCA model is mainly configured to model the change of the face albedo in the three-dimensional face reconstruction. Therefore, the sample is trained to perform the three-dimensional face reconstruction sequentially by the dual PCA model and the single PCA model.

Firstly, the reconstruction parameters matched with the first principal component base and the reconstruction parameters matched with the second principal component base in the dual PCA model are screened out from the estimated reconstruction parameters, and then the screened reconstruction parameters are inputted to the dual PCA model. Corresponding appearance change and expression change are performed on the three-dimensional average face defined in the dual PCA model using a model indication function of the above dual PCA model, such that the corresponding three-dimensional morphable face is acquired. Subsequently, the single PCA model is used to continuously change the albedo of the three-dimensional morphable face to reconstruct the corresponding three-dimensional face.

In S240, the three-dimensional morphable face and reconstruction parameters matched with the third principal component base are inputted to the single PCA model, and a reconstructed three-dimensional face is acquired by performing an albedo correction on the three-dimensional morphable face based on the average face albedo.

In some embodiments, upon acquisition of the corresponding three-dimensional morphable face by the dual PCA model, the reconstruction parameters matched with the third principal component base defined in the single PCA model are screened out again from the estimated reconstruction parameters. Then the three-dimensional morphable face and the reconstruction parameters matched with the third principal component base are both inputted to the single PCA model. The albedo correction is performed on the three-dimensional morphable face based on a face standard albedo using a model representation function of the above single PCA model, such that the reconstructed three-dimensional face is acquired.

In addition, for three-dimensional detail features of the three-dimensional face, the three-dimensional face is optimized by an illumination parameter, a position parameter, and a rotation parameter defined in the three-dimensional morphable model.

In S250, a plurality of loss functions of a plurality of pieces of two-dimensional supervision information between the three-dimensional face and the training sample are calculated, and weights corresponding to the plurality of loss functions are adjusted.

In S260, fitting loss functions are generated based on the plurality of loss functions n and the weights corresponding to the plurality of loss functions, and a trained parameter estimation model is acquired by performing an inverse correction on the neural network model using the fitting loss function.

According to the technical solutions provided in the embodiments, in the training of the parameter estimation model, the dual PCA model is used to construct the three-dimensional morphable model to ensure the accuracy of the three-dimensional face reconstruction. Further, the loss on the plurality of pieces of two-dimensional supervision information between the reconstructed three-dimensional face and the training sample is reflected on the estimation error of the reconstruction parameters as much as possible. The parameter estimation model is trained based on the loss functions of the plurality of pieces of two-dimensional supervision information, such that the reference information in the training is more comprehensive and accurate, and thus the accuracy of estimating the reconstruction parameters used in the three-dimensional face reconstruction is improved.

Third Embodiment

Figure 3B:
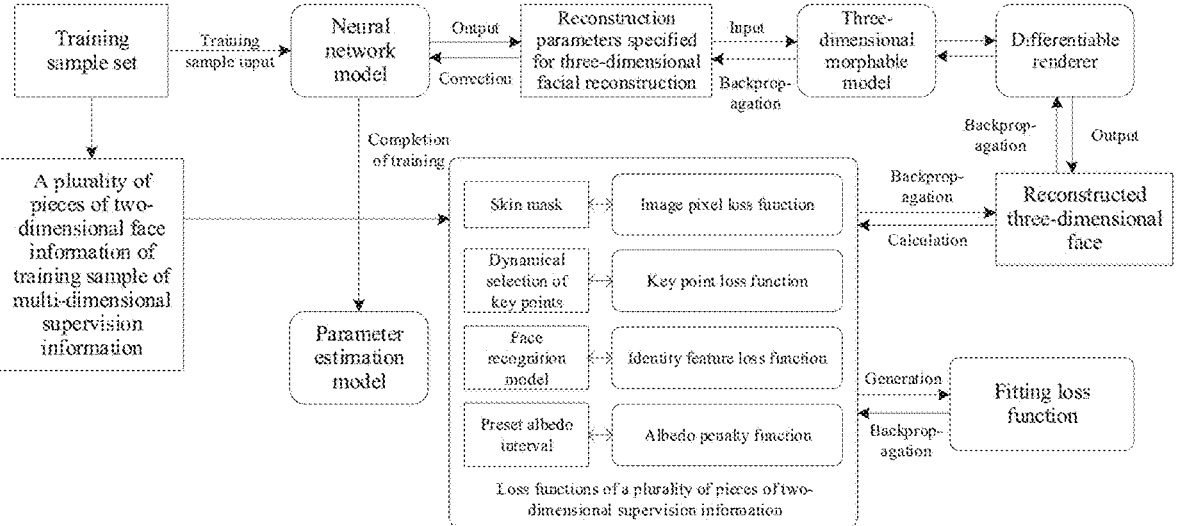
FIG. 3B is a schematic diagram of a principle of a process of training a parameter estimation model according to a third embodiment of the present disclosure.

FIG. 3A is a flowchart of a method for training parameter estimation models according to a third embodiment of the present disclosure; and FIG. 3B is a schematic diagram of a principle of a process of training a parameter estimation model according to a third embodiment of the present disclosure. The embodiment is illustrated based on the above embodiments. As shown in FIG. 3A, the loss functions of the plurality of pieces of two-dimensional supervision information in the embodiments include: an image pixel loss function, a key point loss function, an identity feature loss function, an albedo penalty function, and a regular term corresponding to a target reconstruction parameter in the reconstruction parameters specified for the three-dimensional face reconstruction. The embodiments mainly explain and illustrate a setting method of the loss functions of the plurality of pieces of two-dimensional supervision information referenced by the parameter estimation model in the training.

In some embodiments, as shown in FIG. 3A, the embodiments include the following processes.

In S301, reconstruction parameters specified for three-dimensional face reconstruction are estimated by inputting training samples in a face image training set to a pre-constructed neural network model, and three-dimensional faces corresponding to the training samples are reconstructed by inputting the reconstruction parameters to a pre-constructed three-dimensional morphable model.

In S302, skin masks are segmented from the training samples.

In some embodiments, a mask is a binary image composed of pixel values 0 and 1. In the embodiments, in the case that the image pixel loss function is set, for the accuracy of image pixel loss in the training, the skin masks are applied to the training samples, such that pixel values of a facial skin region in the training sample are all set to 1, and pixel values of a non-facial skin region are all set to 0. Therefore, a skin segmentation algorithm is used to accurately segment the corresponding facial skin region from the training sample, such that interference of pixel features in the non-facial skin region on the three-dimensional face reconstruction is avoided.

In S303, a corresponding image pixel loss function is acquired by calculating, based on the skin masks, pixel errors of the same pixel points in facial skin regions in the three-dimensional faces and the training samples.

In some embodiments, after the skin mask is segmented from the training sample, pixel points at the same pixel position are looked up from the reconstructed three-dimensional faces and the training samples. Then whether each same pixel point is in the facial skin region is accurately judged based on the segmented skin masks. The whole pixel error of the three-dimensional faces and the training samples in the facial skin regions is analyzed by calculating the pixel errors of the pixel points in the facial skin region between the three-dimensional faces and the training samples, such that the image pixel loss function is acquired. The image pixel loss function only compares pixel errors in the facial skin regions prior to and upon reconstruction, but shields an effect of pixels of the non-facial skin region, such that estimated face identity features and albedo information in the reconstruction parameters are more accurate.

Illustratively, the image pixel loss function in the embodiment is:

$$L_{photometric} = \frac{1}{n}\sum_{i=1}^{n}\frac{1}{WH}\sum_{j=1}^{H}\sum_{k=1}^{W}M_{jk}\left\|I_{in}^{i,jk} - I_{out}^{i,jk}\right\|_2,$$

wherein $$I_{in}^{i,jk}$$

represents a pixel value of a pixel point (j, k) in the $i^{th}$ training sample, $$I_{out}^{i,jk}$$

is a pixel value of a pixel point (j, k) in the three-dimensional face reconstructed for the $i^{th}$ training sample, Mix is a pixel value of a pixel point (j, k) in the skin mask, and $M_{jk}$ of a pixel point in the facial skin region in the skin mask is 1, otherwise, 0.

In S304, a plurality of key feature points at a predetermined position are extracted from the training samples, and visibility of the plurality of key feature points is determined.

Figure 3C:
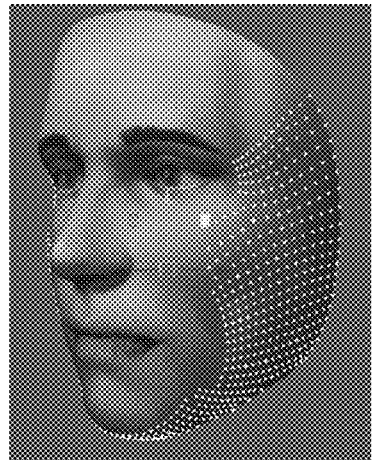
FIG. 3C is a schematic diagram of dynamically selecting key feature points according to a third embodiment of the present disclosure.
Figure 3D:
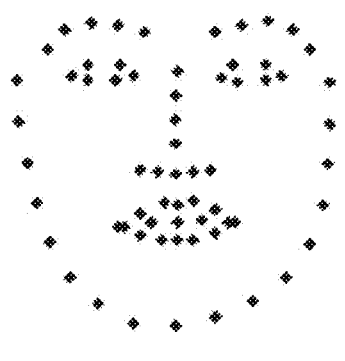
FIG. 3D is a schematic distribution diagram of key feature points according to a third embodiment of the present disclosure.

In some embodiments, for one-to-one matching of the key feature points in the reconstructed three-dimensional faces and the training samples, in the embodiments, in the case that the key point loss functions in the training are set, an Landmark algorithm is used to extract the key feature points at the predetermined positions in a plurality of face regions from the training samples, for example, 17 key feature points on a face contour, five key feature points on left and right eyebrows, six key feature points on left and right eyes, nine key feature points on a nose, 20 key feature points on a mouth, and the like. Illustratively, 68 key feature points are used in the embodiments, as shown in FIG. 3D. As head gestures in different training samples are different, and some key feature points at the predetermined positions are not visible, upon extraction of key feature points at a plurality of predetermined positions from the training samples, whether each key feature point is visible is required to be judged, and only the loss judgment is performed on reconstruction conditions of the visible key feature points, such that the reconstruction of the training samples in various head gestures is achieved.

In S305, the key point loss function is acquired by calculating position reconstruction errors of the plurality of visible key feature points between the three-dimensional faces and the training samples.

In some embodiments, after the plurality of visible key feature points are determined, by analyzing whether pixel positions of the visible key feature points on the reconstructed three-dimensional faces and the training samples are consistent, the position reconstruction error of each visible key feature point prior to and upon reconstruction is calculated, such that the corresponding key point loss function is acquired. For a face with a large head rotation angle in the training sample, only half of the visible key feature points need to be selected to calculate the corresponding key point reconstruction loss, and the invisible key feature points do not participate in the loss calculation of key point reconstruction.

In addition, in the training, the head gestures of the reconstructed three-dimensional faces and the training samples are different. Therefore, for the matching of the same pixel point in the three-dimensional face and the training sample, in the embodiments, vertexes matched with the plurality of visible key feature points in the training sample are determined by dynamically selecting key feature points in the reconstructed three-dimensional face. Illustratively, according to the head gesture in the three-dimensional face, a three-dimensional mesh vertex matched with each visible key feature point is dynamically selected from the three-dimensional face, and position information of the three-dimensional mesh vertex in the three-dimensional face is determined as a reconstruction position of the visible key feature point to calculate a position reconstruction error of the visible key feature point between the three-dimensional face and the training sample.

Firstly, head gestures, such as head translation positions and rotation angles in the reconstructed three-dimensional face are analyzed, and then the three-dimensional mesh vertex matched with each visible key feature point is dynamically selected from the three-dimensional face based on the head gestures in the three-dimensional face and a face part represented by each visible key feature point. As shown in FIG. 3C, the position information of the three-dimensional mesh vertex in the three-dimensional face is determined as the reconstruction position of the visible key feature point, and the reconstruction position of each visible key feature point in the three-dimensional face is calculated in the above method, such that the position reconstruction error of each visible key feature point between the three-dimensional face and the training sample is calculated.

Illustratively, the key point loss function in the embodiments is:

$$L_{landmark} = \frac{1}{68n} \sum_{i=1}^{n} \sum_{j=1}^{68} w_j \left\| \left( 1_{in}^{i,j} - 1_{out}^{i,j} \right) * v_{ij} \right\|_2,$$

wherein $$1_{in}^{i,j}$$

represents a position coordinate of the $j^{th}$ key feature point in the $i^{th}$ training sample, $$1_{out}^{i,j}$$

represents a position coordinate of the $j^{th}$ key feature point in the three-dimensional face reconstructed by the $i^{th}$ training sample, $v_{ij}$ represents visibility of the $j^{th}$ key feature point, a value of the visible key feature point is 1, a value of the invisible key feature point is 0, and $w_j$ is a weight of the $j^{th}$ key feature point in the loss function. Different weights are used in different face parts (such as eyes, mouth, contour points, and the like), and the weights are controlled by adjusting a size of $w_j$.

In S306, first identity features corresponding to the training samples and second identity features corresponding to the three-dimensional faces are acquired by inputting the training samples and the reconstructed three-dimensional faces to a pre-constructed face recognition model.

In some embodiments, for the identity feature loss function, it is essential to analyze whether the identity feature changes prior to and upon reconstruction. Therefore, in the embodiments, for identity feature recognition, a corresponding face recognition model is pre-constructed, and the identity features prior to and upon reconstruction are extracted by the face recognition model. As shown in FIG. 3B, firstly, the training sample and the reconstructed three-dimensional face are inputted to the face recognition model, and face features in the training sample and the three-dimensional face are analyzed by the face recognition model, such that the first identity feature corresponding to the training sample and the second identity feature corresponding to the three-dimensional face are determined, and whether an error is present in the identity features prior to and upon reconstruction is determined.

In addition, as the head gesture in the training sample has a certain rotation angle, part of face region in the training sample is invisible, and the identity features extracted at a single angle have an error. For the accuracy of the first identity feature, the first identity feature corresponding to the training sample in the embodiments is further calculated by: collecting a plurality of face images, containing same faces as the training samples, shot from a plurality of angles, extracting a plurality of identity sub-features corresponding to the plurality of face images by inputting the plurality of face images to the pre-constructed three-dimensional morphable model, and acquiring the first identity features corresponding to the training samples by integrating the extracted plurality of identity sub-features.

By analyzing the face in the training sample, a plurality of face images containing the same face as the training sample are additionally shot from the plurality of angles, and then the face images shot from the plurality of angles are inputted to the three-dimensional morphable model. The identity features of the plurality of face images are extracted based on the first principal component base indicating the change of face appearance in the three-dimensional morphable model, such that the identity sub-feature corresponding to each face image is acquired. In this case, the plurality of identity sub-features are integrated to acquire the first identity feature corresponding to the training sample, such that comprehensiveness and accuracy of the first identity feature are ensured.

In S307, an identity feature loss function is calculated based on similarities between the first identity features and the second identity features.

In some embodiments, upon acquisition of the first identity feature corresponding to the training sample and the second identity feature corresponding to the three-dimensional face, for analysis of whether an error is present in the identity features prior to and upon reconstruction, the similarity between the first identity feature and the second identity feature requires to be determined first, and then a corresponding identity feature loss function is calculated based on the similarity.

Illustratively, the identity feature loss function in the embodiments is:

$$L_{perception} = \frac{1}{n}\sum_{i=1}^{n}\left(1 - \frac{\langle F_{in}^{i}, F_{out}^{i}\rangle}{\|F_{in}^{i}\|\,\|F_{out}^{i}\|_{2}}\right),$$

wherein $$F_{in}^{i}$$

represents a first identity feature corresponding to the $i^{th}$ training sample, and $$F_{out}^{i}$$

represents a second identity feature corresponding to the three-dimensional face reconstructed by the $i^{th}$ training sample.

In S308, albedos of a plurality of vertexes in the three-dimensional face are calculated.

In some embodiments, by detecting information, such as color and reflection light intensity of a plurality of pixel points in the training sample, the albedos of the plurality of pixel points are calculated, and then the albedo of each vertex on the reconstructed three-dimensional face is set based on the position matching between each vertex in the reconstructed three-dimensional face and the plurality of pixel points in the training sample, such that consistency of the face albedo prior to and upon reconstruction is ensured.

In S309, an albedo penalty function is calculated based on the albedos of the plurality of vertexes in the three-dimensional face and a predetermined albedo interval.

In some embodiments, in order to ensure that the albedo of the vertex in the reconstructed three-dimensional face is not too low or too high, the albedo of the vertex in the three-dimensional face is correspondingly adjusted in the embodiments. A reasonable predetermined albedo interval is predetermined in the embodiments, and the predetermined albedo interval in the embodiments is [0.05, 0.95], such that the albedos of the plurality of vertexes in the reconstructed three-dimensional face are completely within the predetermined albedo interval. Therefore, by analyzing whether the albedo of each vertex in the three-dimensional face is within the predetermined albedo interval, a corresponding albedo penalty function is calculated to continuously optimize the albedo in the reconstructed three-dimensional face in the training.

Illustratively, the albedo penalty function in the embodiments is:

$$L_{box} = \frac{1}{n*3N}\sum_{i=1}^{n}\sum_{j=1}^{3N}\left\|T^{i,j} - T_{clip}^{i,j}\right\|_{2},$$

wherein $T^{i,j}$ represents an albedo of the $j^{th}$ pixel point in the $i^{th}$ training sample, and $$T_{clip}^{i,j}$$

is an albedo of the $j^{th}$ pixel point in the three-dimensional face reconstructed by the $i^{th}$ training sample.

In the embodiments, S302 and S303 are processes of calculating the image pixel loss function, S304 and S305 are processes of calculating the key point loss function, S306 and S307 are processes of calculating the identity feature loss function, and S308 and S309 are processes of calculating the albedo penalty function. Calculation processes corresponding to the image pixel loss function, the key point loss function, the identity feature loss function, and the albedo penalty function in the embodiment are performed simultaneously or sequentially, which are not limited.

In S310, weights corresponding to the plurality of loss functions are adjusted.

In S311, fitting loss functions are generated based on the plurality of loss functions and the weights corresponding to the plurality of loss functions, and a trained parameter estimation model is acquired by performing an inverse correction on the neural network model using the fitting loss functions.

According to the technical solutions provided in the embodiments, some loss functions in the plurality of loss functions of the plurality of pieces of two-dimensional supervision information are optimized by the skin mask and dynamically selecting the key feature points in the training sample, such that the accuracy of training the parameter estimation model is ensured. The parameter estimation model is trained based on the loss functions of the plurality of pieces of two-dimensional supervision information, such that the reference information in the training is more comprehensive, and thus the accuracy of estimating the reconstruction parameters used in the three-dimensional face reconstruction is improved.

Fourth Embodiment

Figure 4:
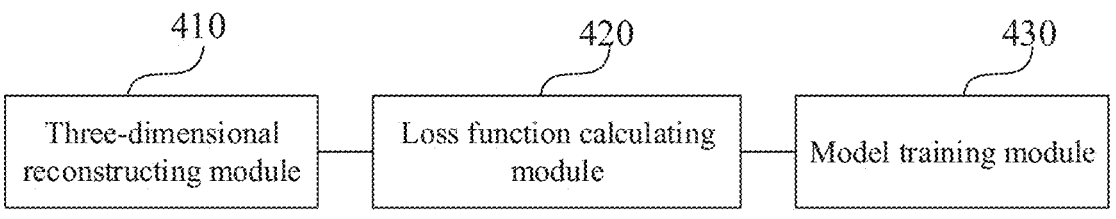
FIG. 4 is a schematic structural diagram of an apparatus for training parameter estimation models according to a fourth embodiment of the present disclosure.

FIG. 4 is a schematic structural diagram of an apparatus for training parameter estimation models according to a fourth embodiment of the present disclosure. As shown in FIG. 4, the apparatus includes:

a three-dimensional reconstructing module 410, configured to estimate reconstruction parameters specified for three-dimensional face reconstruction by inputting training samples in a face image training set to a pre-constructed neural network model, and reconstruct three-dimensional faces corresponding to the training samples by inputting the reconstruction parameters to a pre-constructed three-dimensional morphable model; a loss function calculating module 420, configured to calculate a plurality of loss functions of a plurality of pieces of two-dimensional supervision information between the three-dimensional faces and the training samples, and adjust weights corresponding to the plurality of loss functions; and a model training module 430, configured to generate fitting loss functions based on the plurality of loss functions and the weights corresponding to the plurality of loss functions, and acquire a trained parameter estimation model by performing an inverse correction on the neural network model using the fitting loss function.

According to the technical solutions provided in the embodiments, a corresponding neural network model is pre-constructed for a plurality of reconstruction parameters specifically used in the three-dimensional face reconstruction. Each training sample in a face image training set is inputted to the neural network model to estimate the reconstruction parameters required in the three-dimensional face reconstruction of the training sample, and the reconstruction parameters are inputted to the pre-constructed three-dimensional morphable model to reconstruct the three-dimensional faces corresponding to the training sample. The fitting loss function in training the neural network model is generated by calculating the plurality of loss functions of the plurality of pieces of two-dimensional supervision information between the three-dimensional face and the training sample and adjusting the weights corresponding to the plurality of loss functions. The inverse correction is continuously performed on the neural network model using the fitting loss functions based on the two-dimensional face information of the plurality of pieces of supervision information without referring to additional three-dimensional face information prior to reconstructing the three-dimensional face to acquire the trained parameter estimation model, such that the method for training the parameter estimation models used for estimating the corresponding reconstruction parameters in the three-dimensional face reconstruction is optimized. The parameter estimation model is trained based on the loss functions of the plurality of pieces of two-dimensional supervision information, such that the reference information in the training is more comprehensive, and thus the accuracy of estimating the reconstruction parameters used in the three-dimensional face reconstruction is improved. Meanwhile, the reconstruction parameters in the three-dimensional face reconstruction are estimated by the trained parameter estimation model, such that the deformation process of the to-be-reconstructed face image in the three-dimensional morphable model is more accurate, the accuracy of the three-dimensional face reconstruction is ensured, operation complexity of the three-dimensional face reconstruction is reduced without deploying additional information devices in the three-dimensional face reconstruction.

The apparatus for training the parameter estimation models according to the embodiments is applicable to the method for training the parameter estimation models according to any one of the above embodiments, has and has corresponding functions and effects.

Fifth Embodiment

Figure 5:
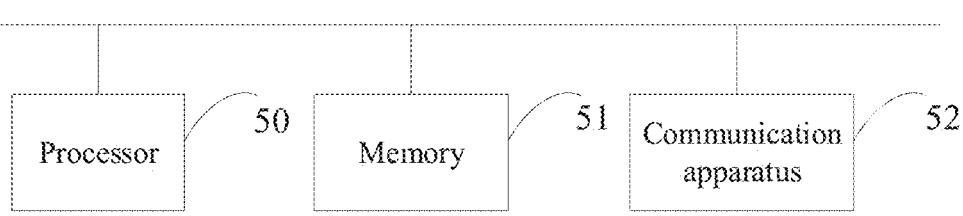
FIG. 5 is a schematic structural diagram of a computer device according to a fifth embodiment of the present disclosure.

FIG. 5 is a schematic structural diagram of a computer device according to a fifth embodiment of the present disclosure. As shown in FIG. 5, the device includes a processor 50, a memory 51, and a communication apparatus 52. A number of processors 50 in the device is one or more, and FIG. 5 is illustrated by taking one processor 50 as an example. The processor 50, the memory 51, and the communication apparatus 52 in the device are connected by a bus or other means, and FIG. 5 is illustrated by taking a bus as an example.

The computer device according to the embodiments is configured to perform the method for training the parameter estimation models according to any one of the above embodiments, and has corresponding functions and effects.

Sixth Embodiment

A sixth embodiment of the present disclosure further provides a non-transitory computer-readable storage medium storing a computer program thereon. The program, when run by a processor, causes the processor to perform the method for training the parameter estimation models according to any one of the above embodiments. The method includes:

estimating reconstruction parameters specified for three-dimensional face reconstruction by inputting training samples in a face image training set to a pre-constructed neural network model, and reconstructing three-dimensional faces corresponding to the training samples by inputting the reconstruction parameters to a pre-constructed three-dimensional morphable model; calculating a plurality of loss functions of a plurality of pieces of two-dimensional supervision information between the three-dimensional faces and the training samples, and adjusting weights corresponding to the plurality of loss functions; and generating fitting loss functions based on the plurality of loss functions and the weights corresponding to the plurality of loss functions, and acquiring a trained parameter estimation model by performing an inverse correction on the neural network model using the fitting loss functions.

The embodiments of the present disclosure provide a storage medium containing computer-executable instructions, and the computer-executable instructions are not limited to the above method operations, but also perform related operations in the method for training the parameter estimation models according to any embodiment of the present disclosure.

The computer-readable storage medium is a non-transitory storage medium.

Based on the above description of the embodiments, the present disclosure is achieved by software and necessary general-purpose hardware or by hardware. The technical solutions of the present disclosure are substantially embodied in the form of a software product. The computer software product is stored in a computer-readable storage medium, such as a floppy disk, a read-only memory (ROM), a random access memory (RAM), a flash memory (FLASH), a hard disk, or an optical disk of a computer, and includes a plurality of instructions causing a computer device (may be a personal computer, a server, or a network device) to perform the method according to the embodiments of the present disclosure.

In the above embodiments of the apparatus for training the parameter estimation models, a plurality of included units and modules are only divided according to function logic, but are not limited to the above division, as long as corresponding functions are achieved. In addition, the names of the plurality of function units are merely for convenience of distinguishing from each other, and are not intended to limit the scope of protection of the present disclosure.

The invention claimed is:

1. A method for training parameter estimation models, comprising:

estimating reconstruction parameters specified for three-dimensional face reconstruction by inputting training samples in a face image training set to a pre-constructed neural network model, and reconstructing three-dimensional faces corresponding to the training samples by inputting the reconstruction parameters to a pre-constructed three-dimensional morphable model;

calculating a plurality of loss functions of a plurality of pieces of two-dimensional supervision information between the three-dimensional faces and the training samples, and adjusting weights corresponding to the plurality of loss functions; and generating fitting loss functions based on the plurality of loss functions and the weights corresponding to the plurality of loss functions, and acquiring a trained parameter estimation model by performing an inverse correction on the pre-constructed neural network model using the fitting loss functions;

wherein the three-dimensional morphable model comprises a dual principal component analysis model and a single principal component analysis model, wherein the dual principal component analysis model comprises a three-dimensional average face, a first principal component base indicating a change of face appearance, and a second principal component base indicating a change of face expression, and the single principal component analysis model comprises an average face albedo and a third principal component base indicating a change of a face albedo; and reconstructing the three-dimensional faces corresponding to the training samples by inputting the reconstruction parameters to the pre-constructed three-dimensional morphable model comprises:

inputting reconstruction parameters matched with the first principal component base and reconstruction parameters matched with the second principal component base to the dual principal component analysis model, and acquiring a three-dimensional morphable face by deforming the three-dimensional average face; and inputting the three-dimensional morphable face and reconstruction parameters matched with the third principal component base to the single principal component analysis model, and acquiring the reconstructed three-dimensional faces by performing an albedo correction on the three-dimensional morphable face based on the average face albedo.

2. The method according to claim 1, wherein the plurality of loss functions of the plurality of pieces of two-dimensional supervision information comprise an image pixel loss function, a key point loss function, an identity feature loss function, an albedo penalty function, and a regular term corresponding to a target reconstruction parameter in the reconstruction parameters specified for the three-dimensional face reconstruction.

3. The method according to claim 2, wherein
in a case of calculating the image pixel loss function between the three-dimensional faces and the training samples, the method further comprises:
segmenting skin masks from the training samples; and
calculating the image pixel loss function between the three-dimensional faces and the training samples comprises:
acquiring the image pixel loss function by calculating, based on the skin masks, pixel errors of same pixel points in facial skin regions in the three-dimensional faces and the training samples.

4. The method according to claim 2, wherein
in a case of calculating the key point loss function between the three-dimensional faces and the training samples, the method further comprises:
extracting a plurality of key feature points at a predetermined position from the training samples, and determining visibility of the plurality of key feature points; and
determining a plurality of visible key feature points based on the visibility of the plurality of key feature points; and
calculating the key point loss function between the three-dimensional faces and the training samples comprises:
acquiring the key point loss function by calculating position reconstruction errors of the plurality of visible key feature points between the three-dimensional faces and the training samples.

5. The method according to claim 4, wherein prior to calculating the position reconstruction errors of the plurality of visible key feature points between the three-dimensional faces and the training samples, the method further comprises:
dynamically selecting, based on head gestures in the three-dimensional faces, three-dimensional mesh vertexes matched with the plurality of visible key feature points from the three-dimensional faces, and calculating the position reconstruction errors of the plurality of visible key feature points between the three-dimensional faces and the training samples by determining position information of the three-dimensional mesh vertexes in the three-dimensional faces as reconstruction positions of the plurality of visible key feature points.

6. The method according to claim 2, wherein
in a case of calculating the identity feature loss function between the three-dimensional faces and the training samples, the method further comprises:

acquiring first identity features corresponding to the training samples and second identity features corresponding to the three-dimensional faces by inputting the training samples and the reconstructed three-dimensional faces to a pre-constructed face recognition model; and calculating the identity feature loss function between the three-dimensional faces and the training samples comprises:

calculating the identity feature loss function based on similarities between the first identity features and the second identity features.

7. The method according to claim 6, wherein the first identity features corresponding to the training samples are further calculated by:

collecting a plurality of face images, containing same faces as the training samples, shot from a plurality of angles, and extracting a plurality of identity sub-features corresponding to the plurality of face images by inputting the plurality of face images to the pre-constructed three-dimensional morphable model; and acquiring the first identity features corresponding to the training samples by integrating the extracted plurality of identity sub-features.

8. The method according to claim 2, wherein in a case of calculating the albedo penalty function of the three-dimensional faces, the method further comprises:

calculating albedos of a plurality of vertexes in the three-dimensional faces; and calculating the albedo penalty function of the three-dimensional faces comprises:

calculating the albedo penalty function based on the albedos of the plurality of vertexes in the three-dimensional faces and a predetermined albedo interval.

9. The method according to claim 1, wherein prior to reconstructing the three-dimensional faces corresponding to the training samples by inputting the reconstruction parameters to the pre-constructed three-dimensional morphable model, the method further comprises:

collecting three-dimensional face scan data with uniform illumination under a multi-dimensional data source, and acquiring the three-dimensional average face, the average face albedo, the first principal component base, the second principal component base, and the third principal component base by performing a deformation analysis, an expression change analysis, and an albedo analysis on the three-dimensional face scan data.

10. The method according to claim 1, wherein the three-dimensional morphable model further comprises an illumination parameter indicating a change of face illumination, a position parameter indicating face translation, and a rotation parameter indicating a head gesture.

11. The method according to claim 1, wherein prior to calculating the plurality of loss functions of the plurality of pieces of two-dimensional supervision information between the three-dimensional faces and the training samples, the method further comprises:

rendering the three-dimensional faces by a differentiable renderer, and training the parameter estimation model based on the rendered three-dimensional faces.

12. The method according to claim 1, wherein upon acquiring the trained parameter estimation models by performing the inverse correction on the pre-constructed neural network model using the fitting loss functions, the method further comprises:

inputting to-be-reconstructed two-dimensional face images to the parameter estimation model, estimating the reconstruction parameters specified for the three-dimensional face reconstruction, and reconstructing three-dimensional faces corresponding to the two-dimensional face images by inputting the reconstruction parameters to the pre-constructed three-dimensional morphable model.

13. A computer device for training parameter estimation models, comprising:

at least one processor; and a memory, configured to store at least one program;

wherein the at least one processor, when running the at least one program, is caused to perform:

estimating reconstruction parameters specified for three-dimensional face reconstruction by inputting training samples in a face image training set to a pre-constructed neural network model, and reconstructing three-dimensional faces corresponding to the training samples by inputting the reconstruction parameters to a pre-constructed three-dimensional morphable model;

calculating a plurality of loss functions of a plurality of pieces of two-dimensional supervision information between the three-dimensional faces and the training samples, and adjusting weights corresponding to the plurality of loss functions; and generating fitting loss functions based on the plurality of loss functions and the weights corresponding to the plurality of loss functions, and acquiring a trained parameter estimation model by performing an inverse correction on the pre-constructed neural network model using the fitting loss functions;

wherein the three-dimensional morphable model comprises a dual principal component analysis model and a single principal component analysis model, wherein the dual principal component analysis model comprises a three-dimensional average face, a first principal component base indicating a change of face appearance, and a second principal component base indicating a change of face expression, and the single principal component analysis model comprises an average face albedo and a third principal component base indicating a change of a face albedo; and reconstructing the three-dimensional faces corresponding to the training samples by inputting the reconstruction parameters to the pre-constructed three-dimensional morphable model comprises:

inputting reconstruction parameters matched with the first principal component base and reconstruction parameters matched with the second principal component base to the dual principal component analysis model, and acquiring a three-dimensional morphable face by deforming the three-dimensional average face; and inputting the three-dimensional morphable face and reconstruction parameters matched with the third principal component base to the single principal component analysis model, and acquiring the reconstructed three-dimensional faces by performing an albedo correction on the three-dimensional morphable face based on the average face albedo.

14. The computer device for training parameter estimation models according to claim 13, wherein the plurality of loss functions of the plurality of pieces of two-dimensional supervision information comprise an image pixel loss function, a key point loss function, an identity feature loss function, an albedo penalty function, and a regular term corresponding to a target reconstruction parameter in the reconstruction parameters specified for the three-dimensional face reconstruction.

15. The computer device for training parameter estimation models according to claim 14, wherein the at least one processor, when running the at least one program, is caused to perform:

segmenting skin masks from the training samples; and acquiring the image pixel loss function by calculating, based on the skin masks, pixel errors of same pixel points in facial skin regions in the three-dimensional faces and the training samples.

16. The computer device for training parameter estimation models according to claim 14, wherein the at least one processor, when running the at least one program, is caused to perform:

extracting a plurality of key feature points at a predetermined position from the training samples, and determining visibility of the plurality of key feature points;

determining a plurality of visible key feature points based on the visibility of the plurality of key feature points; and acquiring the key point loss function by calculating position reconstruction errors of the plurality of visible key feature points between the three-dimensional faces and the training samples.

17. The computer device for training parameter estimation models according to claim 16, wherein the at least one processor, when running the at least one program, is caused to perform:

dynamically selecting, based on head gestures in the three-dimensional faces, three-dimensional mesh vertexes matched with the plurality of visible key feature points from the three-dimensional faces, and calculating the position reconstruction errors of the plurality of visible key feature points between the three-dimensional faces and the training samples by determining position information of the three-dimensional mesh vertexes in the three-dimensional faces as reconstruction positions of the plurality of visible key feature points.

18. The computer device for training parameter estimation models according to claim 14, wherein the at least one processor, when running the at least one program, is caused to perform:

acquiring first identity features corresponding to the training samples and second identity features corresponding to the three-dimensional faces by inputting the training samples and the reconstructed three-dimensional faces to a pre-constructed face recognition model; and calculating the identity feature loss function based on similarities between the first identity features and the second identity features.

19. A non-transitory computer-readable storage medium, storing a computer program thereon, wherein the program, when run by a processor, causes the processor to perform:

estimating reconstruction parameters specified for three-dimensional face reconstruction by inputting training samples in a face image training set to a pre-constructed neural network model, and reconstructing three-dimensional faces corresponding to the training samples by inputting the reconstruction parameters to a pre-constructed three-dimensional morphable model;

calculating a plurality of loss functions of a plurality of pieces of two-dimensional supervision information between the three-dimensional faces and the training samples, and adjusting weights corresponding to the plurality of loss functions; and generating fitting loss functions based on the plurality of loss functions and the weights corresponding to the plurality of loss functions, and acquiring a trained parameter estimation model by performing an inverse correction on the pre-constructed neural network model using the fitting loss functions;

wherein the three-dimensional morphable model comprises a dual principal component analysis model and a single principal component analysis model, wherein the dual principal component analysis model comprises a three-dimensional average face, a first principal component base indicating a change of face appearance, and a second principal component base indicating a change of face expression, and the single principal component analysis model comprises an average face albedo and a third principal component base indicating a change of a face albedo; and reconstructing the three-dimensional faces corresponding to the training samples by inputting the reconstruction parameters to the pre-constructed three-dimensional morphable model comprises:

inputting reconstruction parameters matched with the first principal component base and reconstruction parameters matched with the second principal component base to the dual principal component analysis model, and acquiring a three-dimensional morphable face by deforming the three-dimensional average face; and inputting the three-dimensional morphable face and reconstruction parameters matched with the third principal component base to the single principal component analysis model, and acquiring the reconstructed three-dimensional faces by performing an albedo correction on the three-dimensional morphable face based on the average face albedo.

* * * * *